United States Patent
Boulanger et al.

(10) Patent No.: US 6,621,856 B1
(45) Date of Patent: Sep. 16, 2003

(54) METHOD OF RECEIVING CDMA SIGNALS WITH PARALLEL INTERFERENCE SUPPRESSION, AND CORRESPONDING STAGE AND RECEIVER

(75) Inventors: Christophe Boulanger, Ivry-sur-seine (FR); Laurent Ouvry, Grenoble (FR); Bernard Piaget, Venon (FR); Charles Fort, Vatilieu (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/393,268

(22) Filed: Sep. 10, 1999

(30) Foreign Application Priority Data

Sep. 11, 1998 (FR) .............................. 98 11335

(51) Int. Cl.[7] .............................................. H04B 1/713
(52) U.S. Cl. ...................................... 375/148; 375/150
(58) Field of Search ........................ 375/324, 137–148, 375/349; 455/306; 370/203, 310, 329, 468

(56) References Cited

U.S. PATENT DOCUMENTS 5,361,276 A    11/1994  Subramanian
5,363,403 A  * 11/1994  Schilling et al. ............. 370/342
5,467,368 A  * 11/1995  Takeuchi et al. ............. 370/335
6,175,587 B1 *  1/2001  Madhow et al. ............. 370/335
6,175,588 B1 *  1/2001  Visotsky et al. ............. 375/148

FOREIGN PATENT DOCUMENTS

| DE | 196 23 665 | 4/1997 |
| DE | 196 30 391 | 7/1997 |
| EP | 0 654 913 | 5/1995 |
| EP | 0 756 387 | 1/1997 |
| EP | 0 852 432 | 7/1998 |

* cited by examiner

*Primary Examiner*—Stephen Chin
*Assistant Examiner*—Lawrence Williams
(74) *Attorney, Agent, or Firm*—Oblon, Spivak, McClelland, Maier & Neustadt, P.C.

(57) ABSTRACT

A method of parallel suppression of interference, and corresponding stage and receiver is disclosed according to the invention, parallel suppression of interference is carried out starting from the signals selected by a maximum likelihood criterion based on the calculation of a metric and the search for the smallest possible metric.

7 Claims, 8 Drawing Sheets

METHOD OF RECEIVING CDMA SIGNALS WITH PARALLEL INTERFERENCE SUPPRESSION, AND CORRESPONDING STAGE AND RECEIVER

TECHNOLOGICAL FIELD

The subject of this invention is a method of receiving CDMA signals with parallel interference suppression, a corresponding stage and a corresponding receiver.

It finds application notable in radiocommunication with mobiles.

STATE OF THE PRIOR TECHNOLOGY

The technology of spectrum spreading by a direct sequence consists, schematically of multiplying an information symbol (for example a binary element) by a pseudo-random sequence (also called a code) made up of a sequence of elements called "chips". This operation has the effect of spreading the spectrum of the signal. On reception, the received signal is processed by correlation (or matched filtering) with a pseudo-random sequence identical to that of the transmission, which has the effect of reducing (or correlating) the spectrum. The signal correlated in this way, is processed in order to recover the information symbol.

This technique allows several users to access a single radiocommunications system, with the condition that they use distinct codes. One is then speaking of "Code Division Multiple Access" or CDMA for short.

Despite offering numerous advantages, communications by spectrum spreading with code division multiple access are of limited capacity in terms of the number of users. This limitation is due to interference occurring between signals coming from different users. The more numerous the users are, the more important this interference phenomenon becomes.

Various solutions have been proposed to remedy this disadvantage and, notably, the suppression (or at the very least the reduction) of interference. Hence, in American patent U.S. Pat. No. 5,218,619, for example, sequential suppression of the interference is recommended proceeding by decreasing order of power of the signals from the various users. In American patent U.S. Pat. No. 5,363,403 contrary to this, parallel suppression of these interference signals is recommended. As this invention again takes up this latter technique, we can break off there and illustrate the general structure of a receiver of this type.

The receiver illustrated in the appended FIG. 1 comprises a general input E receiving a composite signal r(t) formed from a plurality of signals corresponding to different information symbols $S_1$, $S_2$, $S_3$ which have been spread by a plurality of pseudo-random codes $C_1$, $C_2$, $C_3$. The receiver shown is assumed to work with three codes but in practice, obviously, this number is higher.

The receiver firstly comprises an input stage with means 101, 102, 103 capable of receiving the composite signal and of supplying a signal correlated by the code $C_1$, $C_2$ or $C_3$ appropriate to each channel; these means can consist of a correlator or a matched filter.

Next the receiver comprises a parallel interference suppression stage 100 which comprises:

means 111, 112, 113 of receiving the correlated signal and supplying an estimation $\hat{S}_1$, $\hat{S}_2$, or $\hat{S}_3$ of the corresponding information symbol; these means can comprise an integrator and a decision circuit means 121, 122, 123 capable of respreading the estimated symbol $\hat{S}_1$, $\hat{S}_2$, or $\hat{S}_3$ using the code $C_1$, $C_2$, $C_3$ appropriate to the channel, to supply the respread signals $s_1$, $s_2$ or $s_3$.

means 131, 132, 133 to subtract from the signal applied to the input of the channel (after a suitable delay produced by a delay circuit 161, 162, 163), the sum $\Sigma_1$, $\Sigma_2$, $\Sigma_3$ of the respread signals coming from the other channels; in other words, the signal $\Sigma_1$ is formed by the sum $s_2+s_3$, the signal $\Sigma_2$ by $s_1+s_3$ and the signal $\Sigma_3$ by $s_1+s_2$. The means 131, 132, 133 supply, in each channel, a new signal $r_1$, $r_2$, $r_3$ which, at least in part, has been cleared of multiple access interference corresponding to other channels.

After the parallel interference suppression stage, there are three matched filters 201, 202, 203 working respectively with the codes $C_1$, $C_2$, $C_3$ and correlating the signals $r_1$, $r_2$, $r_3$ then an output stage 200 with three decision circuits 211, 212, 213 supplying the three data $S_1$, $S_2$ and $S_3$.

Although giving satisfaction in certain regards, such receivers do not eliminate the risks of error. The suppression of interference, if it is carried out without precautions, can even increase this risk. The purpose of this invention is precisely to reduce this risk (in other words to reduce the bit error rate), by improving the means of reconstructing the signals before the actual interference suppression itself. With the invention, a single parallel interference suppression stage offers better performance than the traditional two suppression stages.

In order to obtain this result in the interference suppression stage and to estimate the received data, the invention provides for the use of a particular criterion which is called "The Maximum Likelihood" criterion. This criterion is known of itself in CDMA techniques. One may find a description for example in the work by J. G. PROAKIS entitled "Digital Communications" McGRAW-HILL Inc., $3^{rd}$ edition, 1995, Chapter 5-1-4. However, in the prior art, this criterion is used in an ordinary receiver, and not in a means of parallel suppression of multiple access interference. Furthermore, in the prior art, this criterion is used with the aid of an algorithm called Viterbi's Algorithm, which allows one to find, through a lattice representing all possible configurations, a sequence of data which minimizes a quantity called the "Euclidean distance metric". This technique, which takes into account the whole of the data transmitted by all users, is often very complex. This invention adapts this technique notably by simplifying it. Furthermore it defines a metric which is particularly suitable for the parallel suppression of multiple access interference.

DESCRIPTION OF THE INVENTION

Put precisely, the subject of this invention is a method of receiving CDMA signals with parallel interference suppression in which:

a composite signal is received comprising a plurality of K signals corresponding to information symbols which have been spread in frequency by K different pseudo-random sequences, these K signals are correlated using said K sequences the corresponding K symbols are estimated, the K correlated signals are reconstructed in frequency by respreading said estimated symbols using the corresponding pseudo-random sequences, the contributions of the other signals are subtracted from a respread signal to provide K new signals, spread in frequency but cleared, at least in part of the interference, this method being characterized in that:

all the possible hypotheses possible are formulated on the signs of the NK correlated signals, where N is a whole number equal to 1 or to a few units, for each hypothesis, one calculates the distance metric between the group of correlated signals undergoing processing and the corresponding signals before processing, the hypothesis for which the metric is the smallest is retained, being the hypothesis which has a maximum likelihood, only those signals corresponding to this maximum likelihood hypothesis are reconstructed.

Another subject of the invention is a parallel interference suppression stage that implements this method, this stage comprising:

K inputs receiving signals correlated in frequency,

K means of estimating K symbols corresponding to these K signals,

K means of reconstructing signals respread in frequency using the corresponding pseudo-random sequences, means of parallel interference suppression comprising K channels in parallel capable of subtracting from one respread signal, the contributions of the other respread signals, K outputs supplying K signals spread in frequency, cleared, at least in part of the interference, this stage being characterized in that it comprises means placed between the estimation means and the reconstruction means and capable of formulating all the possible hypotheses on the signs of NK correlated signals, where N is a whole number equal to 1 or to a few units, and of calculating, for each hypothesis, the distance metric between the group of correlated signals undergoing processing and the corresponding signals before processing, and of retaining the hypothesis for which the metric is the smallest, the hypothesis which offers a maximum likelihood.

Another subject of the invention is a receiver for CDMA signals that implements the method defined above and comprising:

a general input capable of receiving a composite signal formed from a plurality of K signals corresponding to information symbols that have been spread in frequency by K different pseudo-random sequences, an input stage with K channels in parallel each comprising filters to correlate in frequency the composite signal through one of the K pseudo-random sequences, this stage supplying K signals correlated in frequency, at least one parallel interference suppression stage, filter stages positioned between the parallel interference suppression stages and comprising K filters matched to the pseudo-random sequences, an output circuit comprising K decision circuits, this receiver being characterized in that at least one of the parallel interference suppression stages is a stage such as that defined above.

DESCRIPTION OF PARTICULAR EMBODIMENTS

Figure 2:
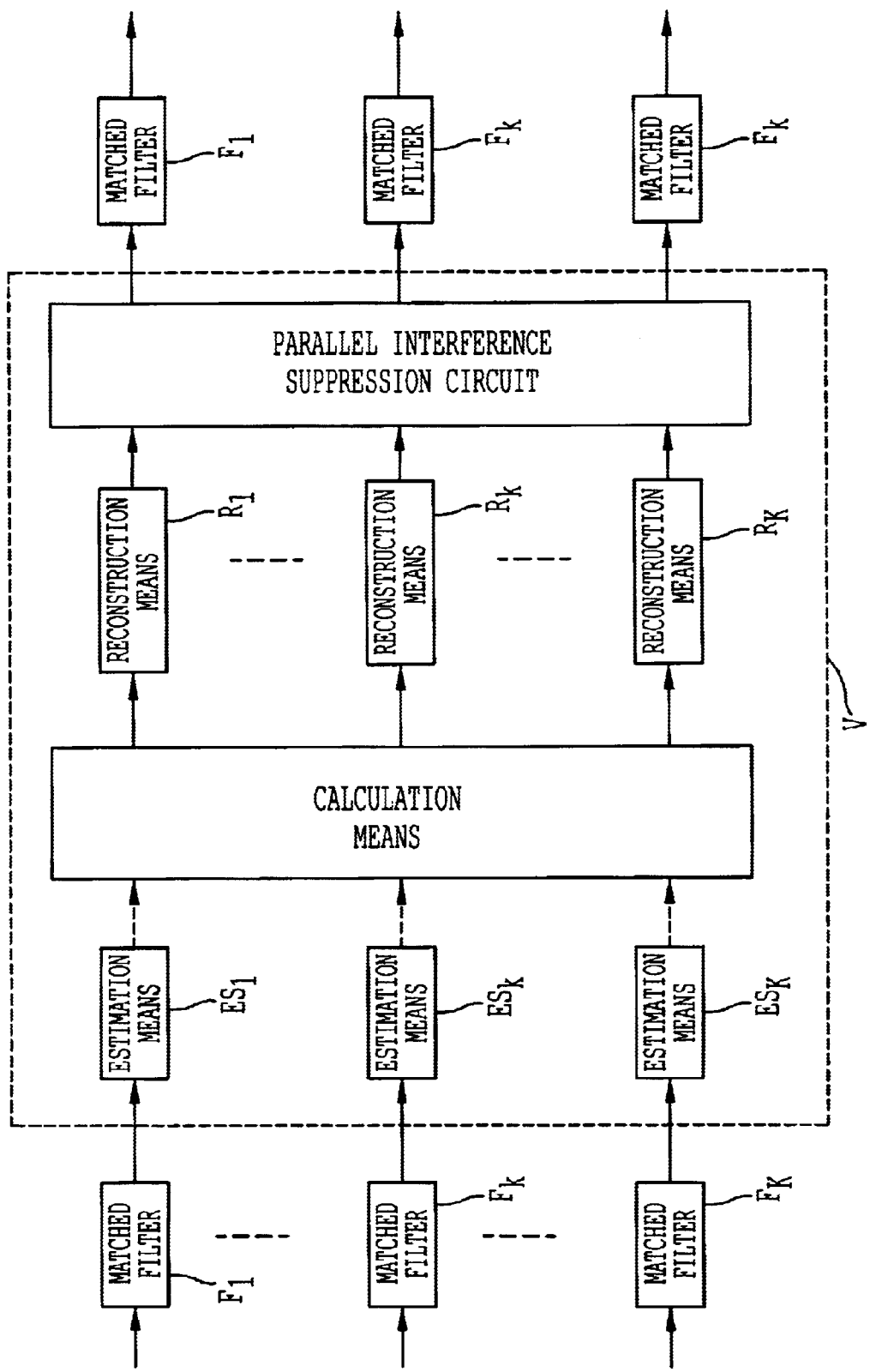
FIG. 2 shows a parallel interference suppression stage with, according to the invention, means based on a maximum likelihood criterion.

FIG. 2 represents a parallel interference suppression stage according to the invention. This stage bears the general reference V. It is preceded by K matched filters (or correlators) $F_1, \ldots, F_k, \ldots, F_K$. The number K designates the number of channels, hence the maximum number of users, the index k being a current index between 1 and K.

Figure 1:
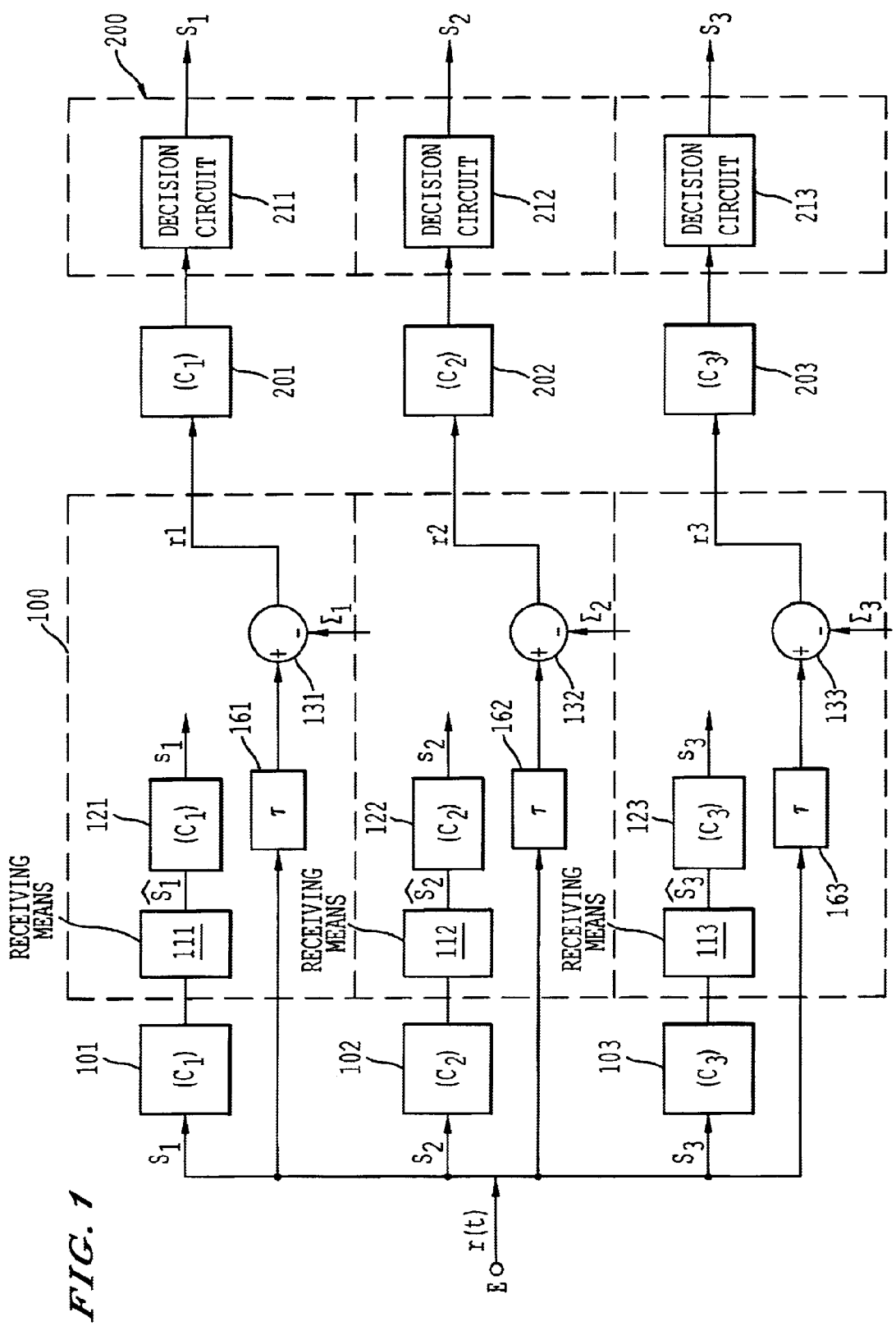
FIG. 1, already described, shows a traditional receiver with parallel suppression of multiple access interference.

Circuit V comprises K means $ES_1, \ldots, ES_k, \ldots, ES_K$ for estimation of the transmitted signal which estimate the amplitude and the lag of each peak supplied by the matched filter which precedes it. The circuit next comprises means M to calculate the metrics (the precise expression for which will be given later), in order to determine the smallest metric and to supply the corresponding signal configuration, which is then the most likely. The circuit further comprises K means $R_1, \ldots, R_k, \ldots, R_K$ to reconstruct the signals, that is to say to supply signals correlated in frequency by the pseudo-random codes. These reconstructed signals are then applied to a parallel interference suppression circuit, the structure of which is not shown but which comprises, as shown in FIG. 1, subtractors, delay lines, etc.

Stage V is followed by matched filters $F_1, \ldots, F_k, \ldots, F_K$ which permit input either to a new parallel interference suppression stage or to an output stage.

In order to illustrate the operation of the means M of calculating the metrics, the simple case of a stage with two channels (therefore with two users) will be considered. It is also assumed that there are several parallel interference suppression stages, each marked by an index i, these stages following an input stage to each of which the index o has been allocated.

In the stage with index i, the two means of estimating the amplitude of the transmitted signal, supply two signals marked $Z_i(1)$ for the first channel and $Z_i(2)$ for the second, while the two matched filters of the input stage supply signals $Z_o(1)$ and $Z_o(2)$.

The circuit M considers the absolute value of the amplitudes of these signals, or $|Z_i(1)|$ and $|Z_i(2)|$ and formulates two hypotheses on the sign that can be allocated to these values, namely + or −. There are therefore $2_2=4$ hypotheses for the groups of two signals taken with their sign, these four hypotheses (designated $(Hyp)_j$) being labeled with an index j that goes from 1 to 4. The four configurations corresponding to these four hypotheses are the following:

$$(Hyp)_1 = \begin{vmatrix} +Z_i & (1) \\ +Z_i & (2) \end{vmatrix} \quad (Hyp)_2 = \begin{vmatrix} +Z_i & (1) \\ -Z_i & (2) \end{vmatrix}$$

$$(Hyp)_3 = \begin{vmatrix} -Z_i & (1) \\ +Z_i & (2) \end{vmatrix} \quad (Hyp)_4 = \begin{vmatrix} -Z_i & (1) \\ -Z_i & (2) \end{vmatrix}$$

According to classical notation, each group of two signals can be considered as the two components of a vector designated ($\vec{Z}_i$). Therefore there are four possible vectors according to the retained hypothesis, namely:

$$(\vec{Z}_i)_1, (\vec{Z}_i)_2, (\vec{Z}_i)_3, (\vec{Z}_i)_4$$

The invention uses a Euclidean distance metric, afterwards referred to as the metric, of the form $$\left(\Sigma(\vec{X} - \vec{Y})\right)^2$$

where $\vec{X}$ and $\vec{Y}$ represent two vectors. Such a metric measures, in a way, the distance between the two extreme points of the vectors. The smaller the metric is, the closer the vectors are.

The following four metrics, corresponding to the four formulated hypotheses, will therefore be calculated:

$$(M_1 = (|Z_o(1)| - |Z_i(1)|)^2 + |Z_o(2)| - |Z_i(2)|)^2$$

$$(M_2 = (|Z_o(1)| - |Z_i(1)|)^2 + |Z_o(2)| + |Z_i(2)|)^2$$

$$(M_3 = (|Z_o(1)| + |Z_i(1)|)^2 + |Z_o(2)| - |Z_i(2)|)^2$$

$$(M_4 = (|Z_o(1)| + |Z_i(1)|)^2 + |Z_o(2)| + |Z_i(2)|)^2$$

The smallest of these metrics corresponds to the configuration closest to the configuration at the output from the input stage and hence to the most likely configuration. If, for example, the smallest metric is the third one $M_3$, the most likely configuration will be:

$$\vec{Z}_i = \begin{matrix} -|\vec{Z}_i(1)| \\ +|\vec{Z}_i(2)| \end{matrix}$$

The means M will then supply the signals $-|Z_i(1)|$ and $+|Z_i(2)|$ and the two reconstitution circuits which follow it will spread these signals using the two appropriate pseudo-random sequences. The traditional means of parallel interference suppression will then receive the spread signals of maximum likelihood and will then be able to correct these signals in an optimum way.

In a general way, the means M for a stage of row i calculates the quantity $$\sum_{block} (\vec{Z}_o - (\vec{Z}_i)_j)^2$$

where the summation is extended at least to the values that constitute the block of data within a time interval equal to N symbol durations.

With N =1, there are only K components to be processed (the case referred to as a single symbol block) and the number of hypotheses to be formulated is $2^K$. With NK components, this number rises to $2^{NK}$. To prevent too much complexity, N is limited to a few units, for example, less than 5.

Figure 3:
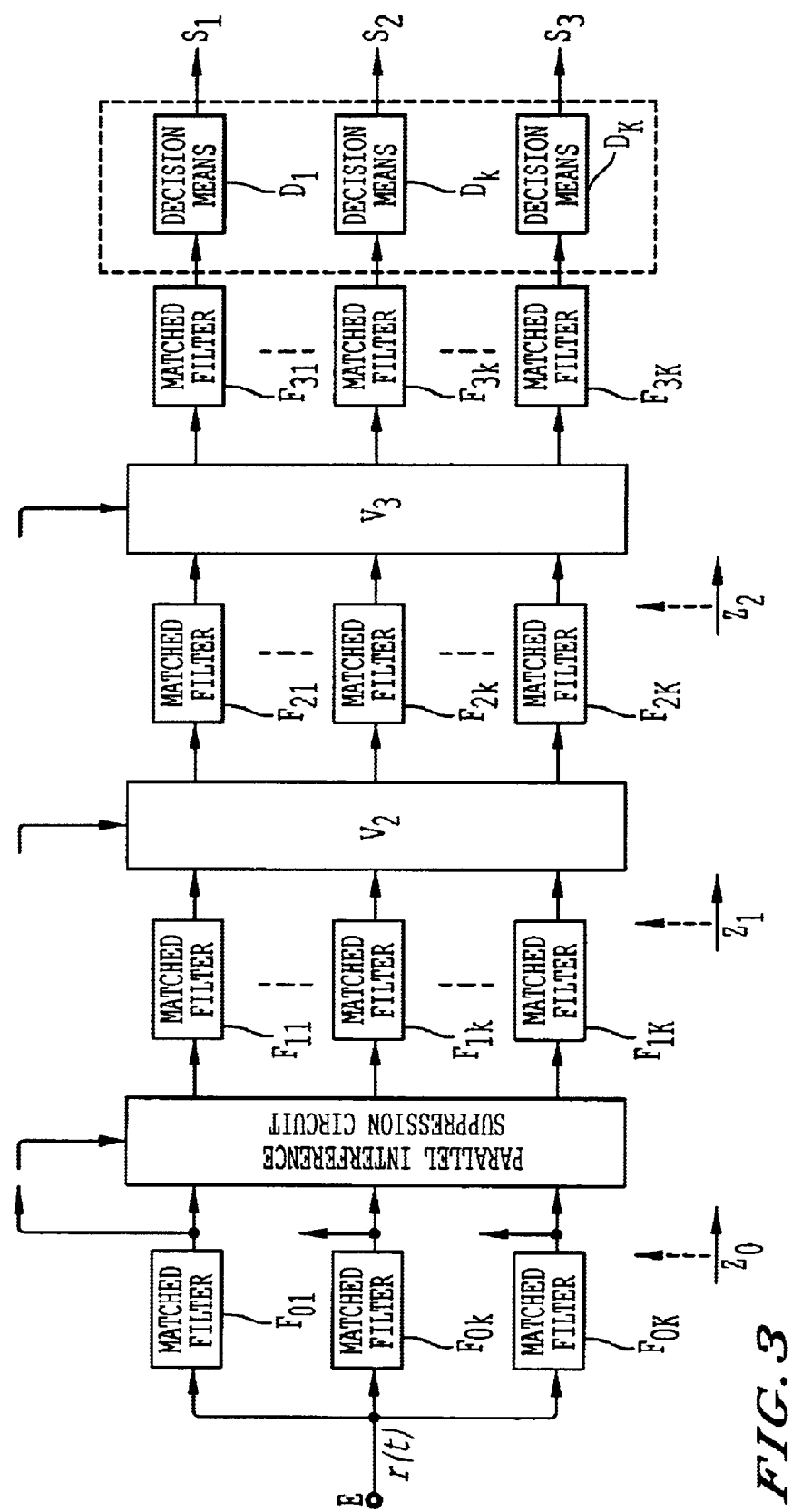
FIG. 3 shows a receiver conforming to the invention with three interference suppression stages conforming to the invention.

FIG. 3 illustrates a complete receiver that comprises an input stage and an output stage, as for FIG. 1, with three parallel interference suppression steps with references $V_1$, $V_2$, $V_3$ conforming to what has just been described. The receiver further comprises the associated matched filters, $F_{11}, \ldots, F_{1k}, \ldots, F_{1K}$ for the first, $F_{21}, \ldots, F_{2k}, \ldots, F_{2K}$ for the second and $F_{31}, \ldots, F_{3k}, \ldots, F_{3K}$ for the third.

Figure 4:
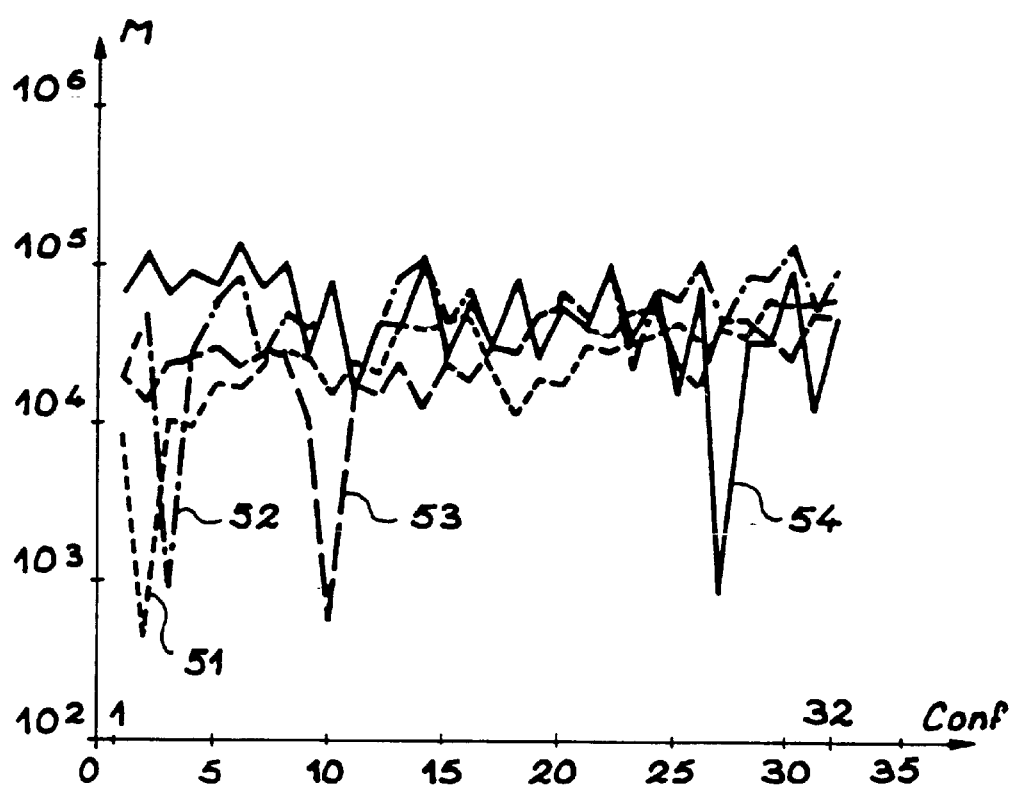
FIG. 4 shows examples of the change in metrics as a function of the hypotheses on the signs

In order to illustrate the variations in value taken by the metric as a function of the hypotheses made on the signs, we may consider the case of three users, each using pseudo-random sequences each with 63 elements or chips, the modulation employed being differential type modulation with quaternary phase modulation (DQPSK) with two channels per user, namely one channel in phase (called I) and one channel in phase quadrature (called Q). There are therefore 6 channels in parallel, or $2^6=32$ possible hypotheses on the signs of a single symbol block. These 32 hypotheses or configurations are labeled by their row in the diagram in FIG. 4, the row being shown on the x-axis, and the values taken by the metric being shown on the y-axis. Four different cases are shown corresponding to the four curves 51, 52, 53 and 54. The value of the metric is expressed in elements or chips. The scale is logarithmic. It can be clearly seen that for a certain configuration, the metric passes through a minimum. This configuration is that of maximum likelihood. It may also be observed that the minima are clearly evident and can therefore be easily exploited.

The method and the receiver that have just been described assume, for the totally general case, that $2^{NK}$ hypotheses are formulated. The complexity of the method can naturally be reduced by reducing the block of data with K data (a single symbol block mentioned above). However this complexity can be further reduced, in the method of seeking the maximum likelihood, by only taking into account those signals for which the estimation is judged to have little reliability or to put it another way by excluding from the method those signals judged to be reliable. Assuming that Q signals are reliable, only K–Q signals will be retained for the calculation of the metrics, which corresponds to $2^{K-Q}$ hypotheses.

Means of measuring reliability are described and claimed in French patent application No. 98 09782 filed by the present applicant on the Jul. 30$^{th}$ 1998.

However other criteria of reliability can be used, such as those which are described in patent U.S. Pat. No. 5,644,592.

Figure 5:
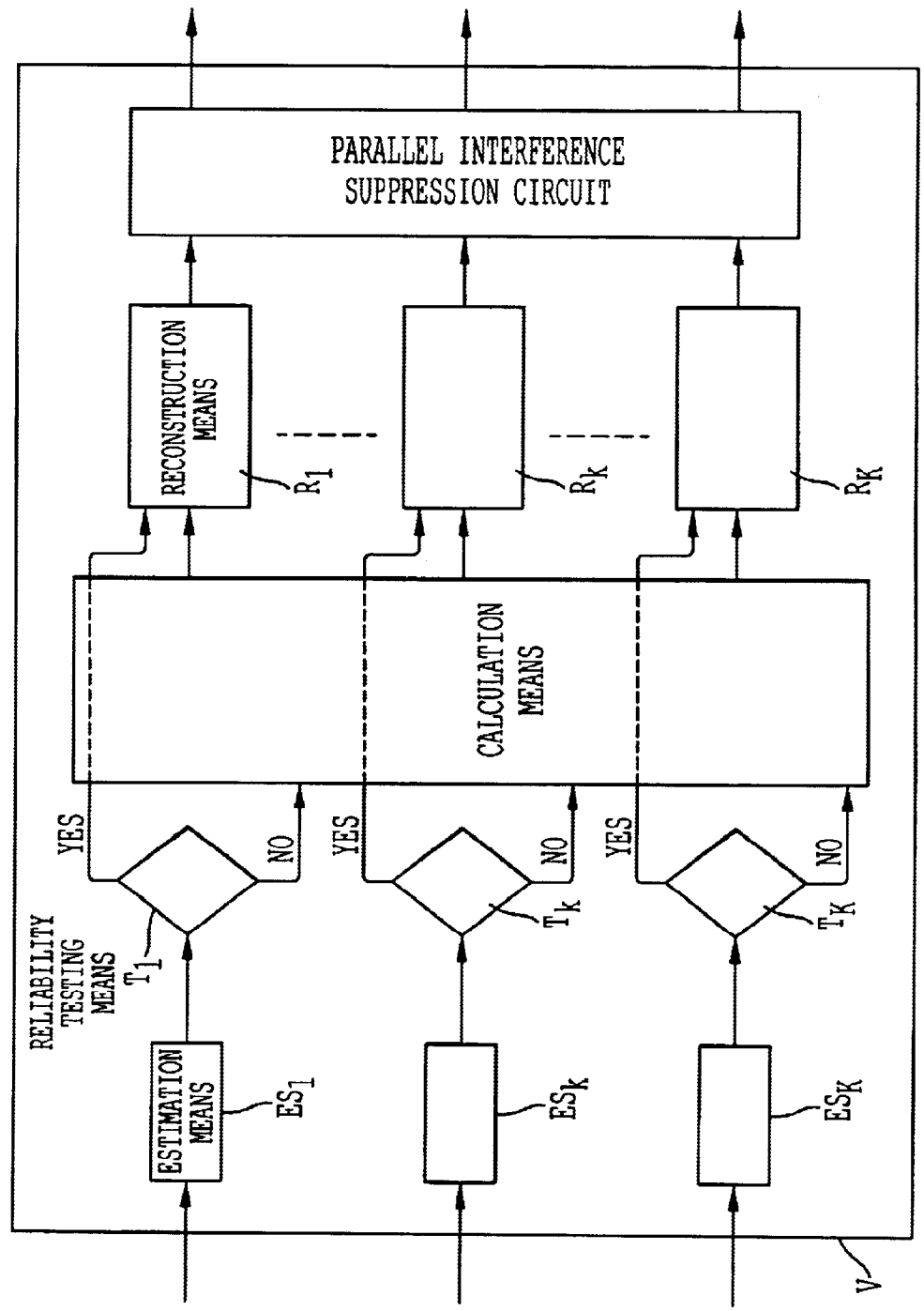
FIG. 5 illustrates a variant where the reliability of the estimation is tested and where only the data of low reliability are used in the calculation of the metrics.

FIG. 5 illustrates an embodiment of a stage simplified in this way. Compared with the stage in FIG. 2, stage V' comprises reliability testing means $T_1, \ldots, T_k, \ldots, T_K$ which receive the signals coming from the estimation circuits $ES_1, \ldots, ES_k, \ldots, ES_K$ and which address either the circuit M for calculation of the metrics (branch marked NO) or the reconstruction circuits $R_1, \ldots, R_k, \ldots, R_K$ (branch marked YES).

Naturally, several of these simplified stages can be cascaded, as for FIG. 3.

Figure 6:
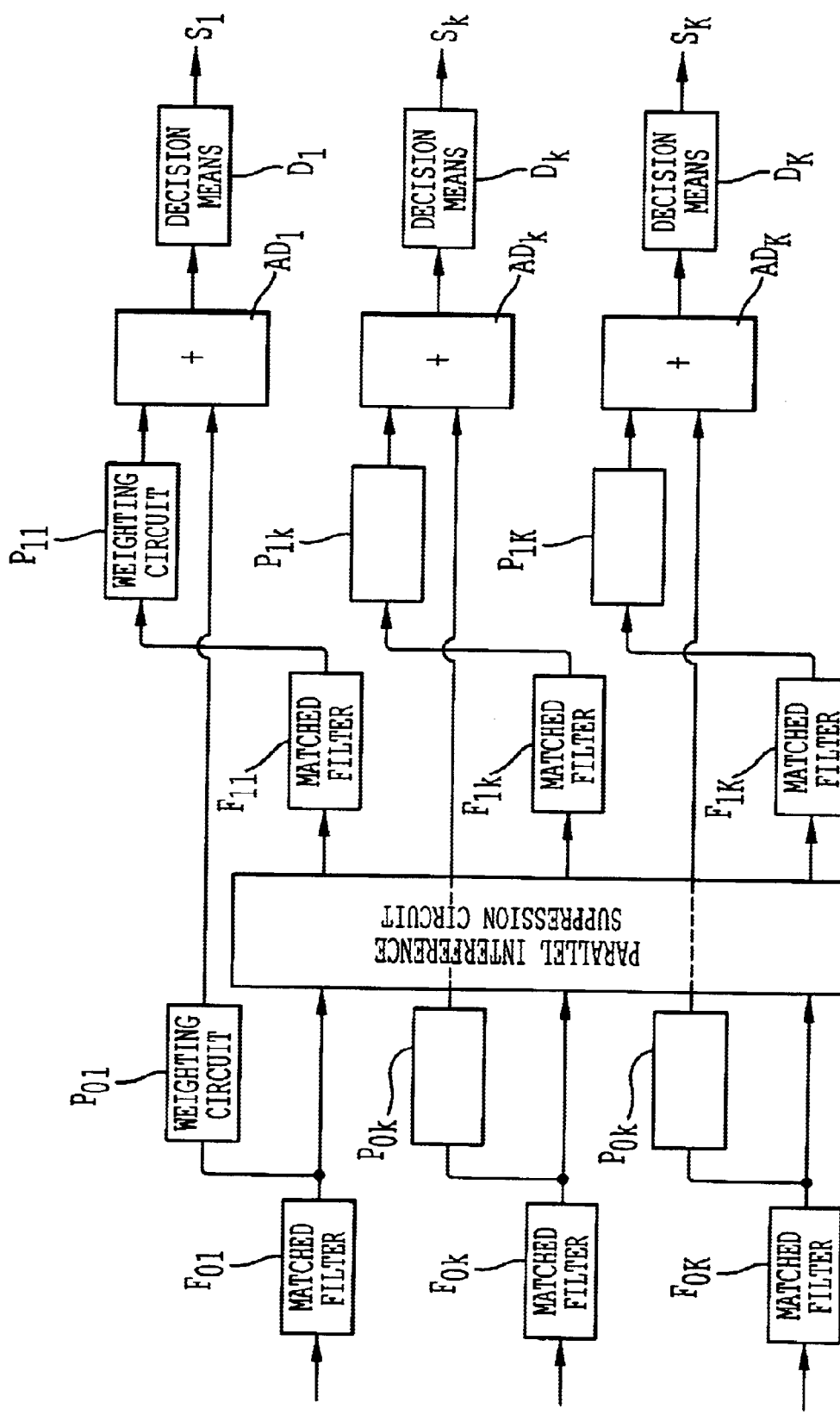
FIG. 6 illustrates another variant where the outputs from the matched filters are connected to the output stage through weighting means.

In another particular embodiment, the signals supplied by the matched filters can be linearly combined before they are addressed to the output stage. One can see in FIG. 6, the first weighting means $P_{01}, \ldots, P_{0k}, \ldots, P_{0K}$ arranged at the output from the matched filters $F_{01}, \ldots, F_{0k}, \ldots, F_{0K}$ of the input stage, weighting circuits $P_{11}, \ldots, P_{1k}, \ldots, P_{1K}$ arranged at the output from the matched filters placed behind stage V'1 for parallel interference suppression and adders $AD_1, \ldots, AD_k, \ldots, AD_K$ the inputs of which are connected to the weighting circuits and the output to the decision circuits $D_1, \ldots, D_k, \ldots, D_K$.

The weighting coefficients can be fixed or variable. Such a technique is described in U.S. Pat. No. 5,553,062.

Figure 7:
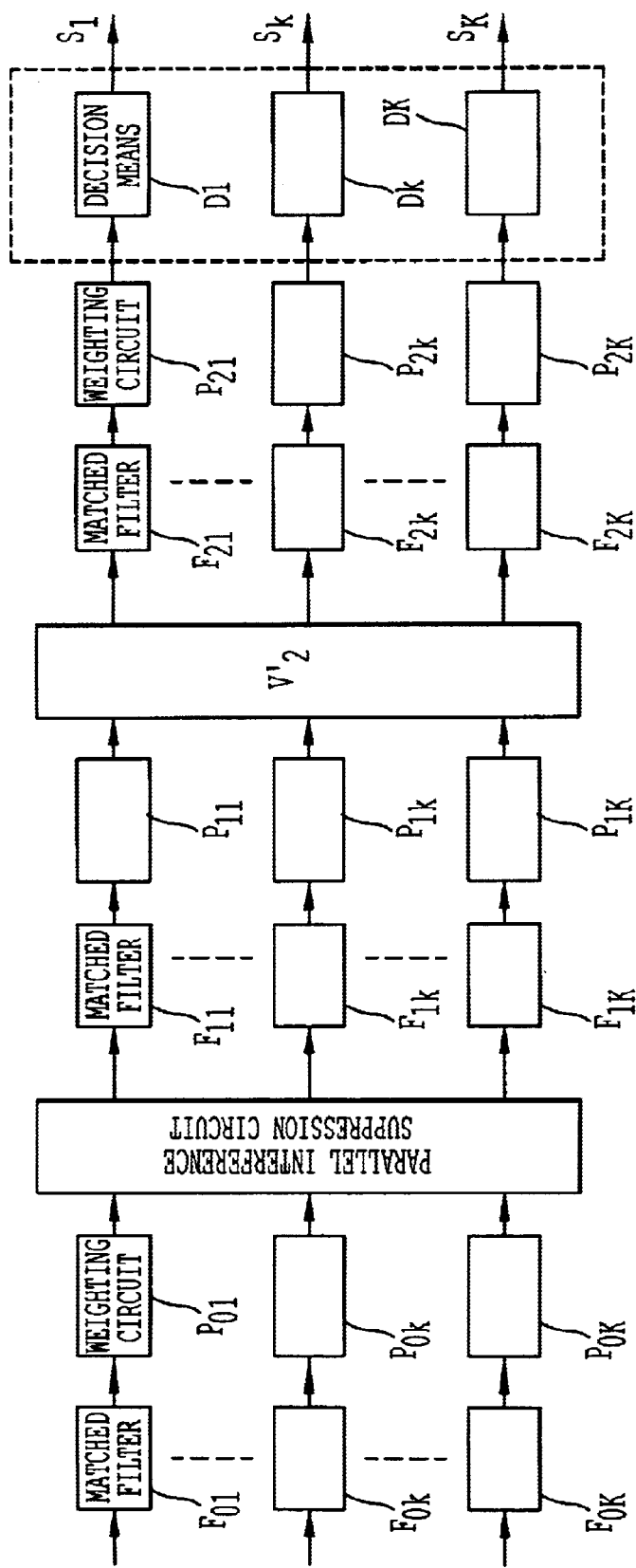
FIG. 7 illustrates yet another variant where the outputs from the matched filters are weighted according to reliability thresholds.

One can also improve the reconstructions and estimations of the signals by using the reliability thresholds in order to reconstruct or not to reconstruct (or to only partially reconstruct) certain signals. Such a technique is described and claimed in the French patent application No. 98 03586 filed on the Mar. $24^{th}$ 1998 by the present applicant. A technique of this kind is also described in the patent U.S. Pat. No. 5,644,592. FIG. 7 illustrates this particular embodiment in the case of two simplified, (that is to say conforming to FIG. 5), parallel, interference suppression stages $V'_1$ and $V'_2$. One can see the first weighting circuits $P_{01}, \ldots, P_{0k}, \ldots, P_{0K}$, the second weighting circuits $P_{11}, \ldots, P_{1k}, \ldots, P_{1K}$ and finally the third weighting circuits $P_{21}, \ldots, P_{2k}, \ldots, P_{2K}$.

Figure 8:
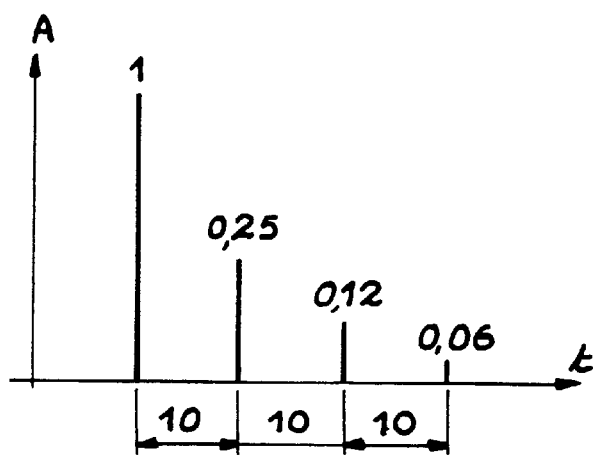
FIG. 8 shows a pulse response that has been used for the performance assessment of a receiver conforming to the invention.
Figure 9:
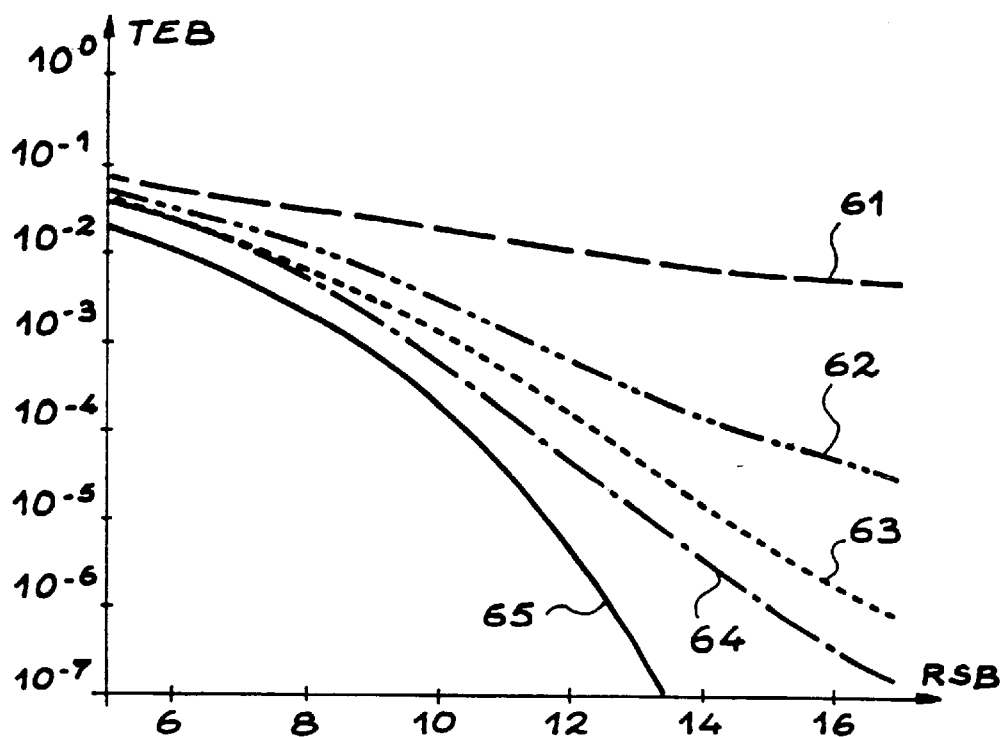
FIG. 9 shows the variations in the bit error rate as a function of the signal to noise ratio for a first pulse response from a channel involving a single path.
Figure 10:
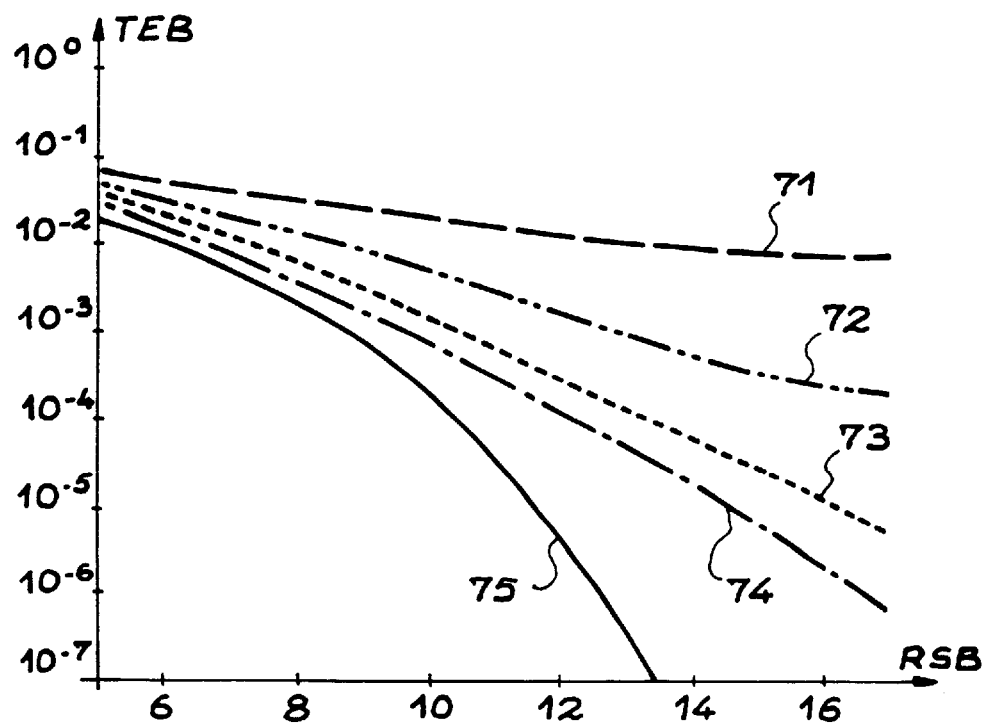
FIG. 10 shows the variations in the bit error rate as a function of the signal to noise ratio for the pulse response from FIG. 8.

The performance of a receiver according to the invention has been simulated by the applicant. To do this, certain hypotheses have been formulated for the pulse response of the propagation channel. Firstly, one can consider an ideal pulse response which would be formed by a single peak, which would correspond to an absence of multiple paths. However, one can also choose a more realistic hypothesis, illustrated in FIG. 8, where one can see a first amplitude peak 1 and three amplitude peaks respectively equal to 0.25, 0.12 and to 0.06 representing three secondary paths. The results of the simulation are shown in FIGS. 9 and 10 for these two hypotheses. In these Figures, the bit error rate is shown on the y-axis and the signal to noise ratio on the x-axis. The following reference numbers have been used for the curves.

61, 71 corresponding to a traditional structure 62, 72 corresponding to parallel interference suppression with one stage 63, 73 corresponding to parallel interference suppression with two stages 64, 74 corresponding to parallel interference suppression according to the invention (simplified version in the case of K=5 users)

65, 75 corresponding to a theoretical parallel interference suppression for a single user in DQPSK modulation with a Gaussian channel.

It can be seen that the invention leads to a significant improvement in performance. In particular, a single stage of parallel interference suppression (in the simplified version) offers better performance than the traditional two stages.

What is claimed is:

1. A method of receiving CDMA signals with parallel interference suppression in which:

a composite signal (r(t)) is received comprising a plurality of K signals corresponding to information symbols which have been spread in frequency by K different pseudo-random sequences, these K signals are correlated using said K sequences the corresponding K symbols are estimated, the K signals correlated in frequency are reconstructed by despreading said estimated symbols through the corresponding pseudo-random sequences, the contributions of the other (K-1) signals are subtracted from a despread signal to provide K new signals, spread in frequency but cleared, at least in part of the interference, this method being characterized in that:

all the possible hypotheses on the signs of the NK correlated signals are formulated, where N is a whole number equal to 1 or to a few units, for each hypothesis, one calculates the distance metric between the group of correlated signals undergoing processing and the corresponding signals before processing, the hypothesis for which the metric is the smallest is retained, being the hypothesis which has a maximum likelihood, only those signals corresponding to this maximum likelihood hypothesis are reconstructed.

2. A parallel interference suppression stage implementing the method according to claim 1, this stage comprising:

K inputs receiving signals correlated in frequency,

K means of estimating ($ES_1, \ldots, ES_k, \ldots, ES_K$) K symbols corresponding to these K signals, K means of reconstructing ($R_1, \ldots, R_k, \ldots, R_K$) signals respread in frequency using the corresponding pseudo-random sequences, means of parallel interference suppression comprising K channels in parallel capable of subtracting from one despread signal, the contributions of the other (K-1) despread signals, K outputs supplying K signals spread in frequency, cleared, at least in part of the interference, this stage being characterized in that it comprises:

means (M) placed between the estimation means ($ES_1, \ldots, ES_k, \ldots, ES_K$) and the reconstruction means ($R_1, \ldots, R_k, \ldots, R_K$) and capable of formulating all the possible hypotheses on the signs of NK correlated signals, where N is a whole number equal to 1 or to a few units, and of calculating, for each hypothesis, the distance metric ($M_j$) between the group of correlated signals undergoing processing and the corresponding signals before processing, and of retaining the hypothesis (j) for which the metric ($M_j$) is the smallest, the hypothesis which offers a maximum likelihood.

3. Stage according to claim 2, in which the means of calculating the metric comprise:

means of formulating two hypotheses on the sign to be assigned to the amplitude of the signals supplied by the means of estimation, means of calculating all the differences $Z_0(k)-Z_i(k)_j$, where $Z_0(k)$ represents the signal at the output from the $k^{th}$ matched filter of the input stage and $Z_i(k)_j$ the signal at the output from the $k^{th}$ matched filter of the stage of row i, the signal being allocated the sign corresponding to each hypothesis j, means of calculating the square of these differences, or $(Z_0(k)-Z_i(k)_j)^2$, means of calculating the sum of these squares for all NK values of the signals, which leads, for each hypothesis (j), to the metric ($M_j$).

4. A receiver of CDMA signals that implements the method of claim 1 and comprises:

a general input (E) suitable for receiving a composite signal (r(t)) formed from a plurality of K signals corresponding to information symbols which have been spread in frequency by K different pseudo-random sequences, an input stage with K channels in parallel each comprising filters ($F_{01}, \ldots, F_{0k}, \ldots, F_{0K}$) to correlate in frequency the composite signal (r(t)) through one of the K pseudo-random sequences, this stage supplying K signals correlated in frequency, at least one parallel interference suppression stage ($V_1, V_2, \ldots$), filter stages positioned between the parallel interference suppression stages and comprising K filters ($F_{1k}, F_{2k}, \ldots$) matched to the pseudo-random sequences, an output circuit (S) comprising K decision circuits ($D_1, \ldots, D_k, \ldots, D_K$)

this receiver being characterized in that at least one of the parallel interference suppression stages is a stage according to claims 2 or 3.

5. A receiver according to claim 4, in which the estimated signals have a certain reliability and in which the means (M) for formulating two hypotheses on the sign to be assigned to these signals only take into account the signals with a reliability below a fixed threshold, the other signals having a reliability above the threshold being used directly by the interference suppression means.

6. A receiver according to claim 4, in which the input stage with its filters and each stage of matched filtering comprise means of weighting ($P_{0k}$) the outputs from the filters ($F_{0k}$), the output stage (S) comprising adders ($AD_k$) the inputs to which are connected to the weighting circuits ($P_{ok}$) and the output from which is connected to the decision circuits ($D_k$).

7. A receiver according to claim 4, in which each stage of filtering is followed by a weighting circuit ($P_{0k}, P_{1k}, P_{2k}, \ldots$) arranged between the output from the filtering stage and the input to the interference suppression stage, the weighting depending on the reliability of the estimation made in the stage.

* * * * *